United States Patent Office 3,325,622
Patented June 13, 1967

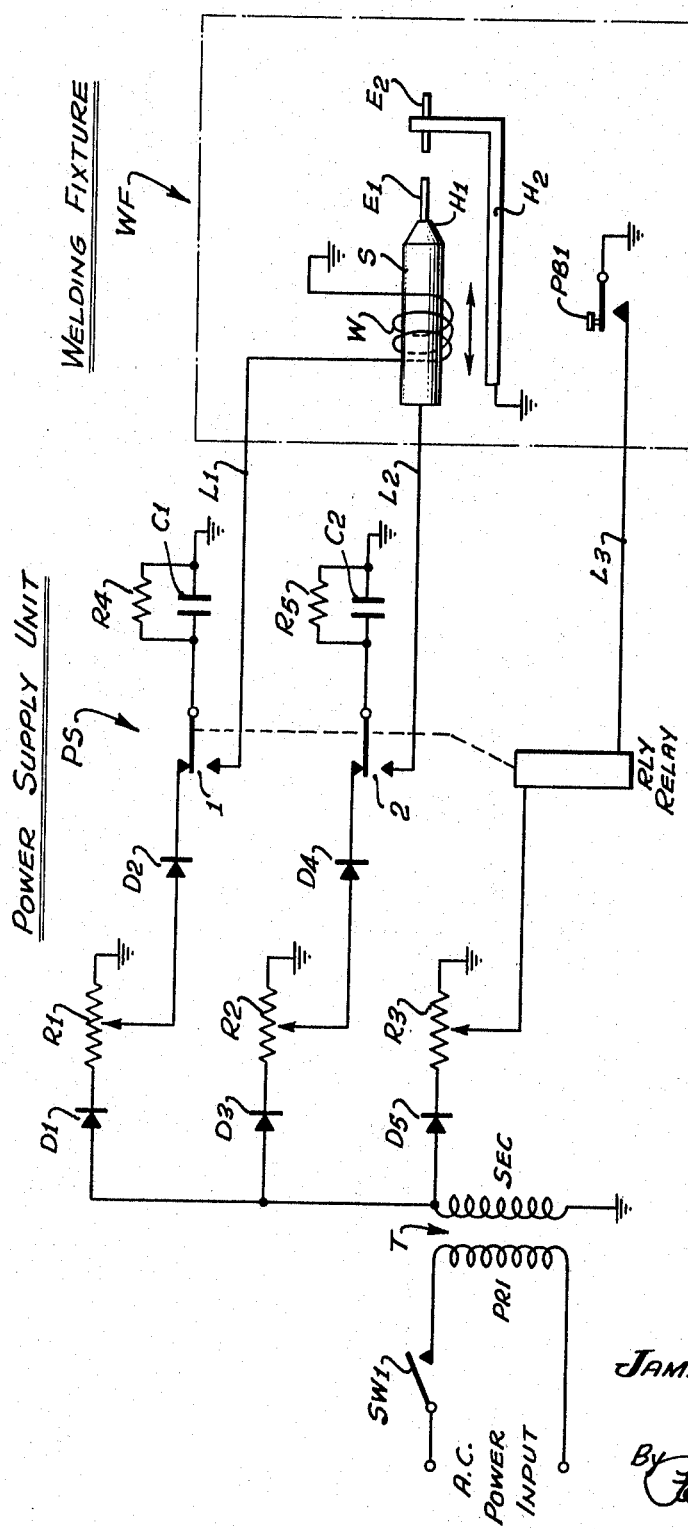

3,325,622
DUAL-ENERGY PERCUSSIVE ARC WELDING SYSTEM
James E. Cordner, Alhambra, Calif., assignor, by mesne assignments, to The Sippican Corporation, Marion, Mass., a corporation of Massachusetts
Filed June 30, 1965, Ser. No. 479,031
7 Claims. (Cl. 219—95)

ABSTRACT OF THE DISCLOSURE

The present invention includes a percussive arc welding system having two electrical energy storage circuits in the form of separately chargeable capacitance means, a welding fixture for supporting two electrodes to be welded together, one of said electrodes being held in a fixed position while the second electrode is movably held by an electromagnetically operated support, an electrical winding adapted to cooperate with the movable support in flux linking relationship and electrical connecting means for coupling an electrical energy storage circuit to the electrodes and for coupling the other electrical energy storage circuit with the winding for generating a magnetic field capable of moving the movable support toward and into percussive contact with the fixedly held electrode. It is within the scope of the present invention to be able to independently control the velocity of said movable support apart from the welding current, enabling separate control of the solenoid force and welding currents.

---

This invention relates in general to arc welding apparatus and in particular to arc-percussive welding systems of the type in which the ends of electrodes or weldments are melted by an arc established therebetween and are forcibly driven together to provide a forged connection. Its principal object is to provide a welding system of the above character which provides improved welded connections.

Specifically, the invention is directed toward a welding system utilizing a "welding gun" in the form of a portable hand tool which receives the welding current and forging energy from an associated power supply. An example of such a gun and power supply is shown in the copending application of T. W. Conrad, Ser. No. 359,025, filed Apr. 13, 1964 and entitled, "Welding Accessory."

In the noted T. W. Conrad application, the electrodes are spaced apart a predetermined distance and operation of a switch on the welding accessory causes a welding pulse to be generated which establishes an arc between the electrodes causing the ends thereof to melt. The resulting welding current is arranged to pass through the winding of a solenoid carrying one of the electrodes and cause the two electrodes to forcibly be driven together. A characteristic of this system is that the speed and consequent impact force of the solenoid is a function of the welding current which necessarily must be of a magnitude and duration suitable for the size and type of material used in the weldments. Accordingly, the speed and force of the solenoid for a particular type of material may be too great and cause distortion of the weldment or may be too little and provide a proper forged connection. Therefore, it is an object of this invention to provide a welding system wherein the speed and force of the solenoid is independent of the welding current.

Another object of the invention is to provide a welding system in which the speed and force of the solenoid is adjustable.

Other objects and features of the invention will be best understood when the specification and claims are read in conjunction with the accompanying drawing in which a schematic diagram of a dual-energy power supply and a diagrammatic view of a welding fixture or gun are shown.

The present invention fulfills the aforementioned objects and overcomes the limitations and disadvantages of prior art solutions by providing a percussive arc welding system having two electrical energy storage circuits capable of independently controlling solenoid force and speed, as well as separately controlling the magnitude of welding current delivered to a pair of electrodes. One of the electrodes is fixedly held in an electrical holder while the other electrode is movably held in an electrode holder cooperatively connected to a solenoid. Initially the electrodes are spaced apart, however upon energizing of the solenoid the movably supported electrode is caused to move toward the fixedly held electrode until a welding arc is struck resulting from a potential created between the electrodes. The heat generated by the arc results in the ends of the electrode melting, at which time the melted ends are caused to be forced together to form a weld therebetween. A first potentiometer means is provided for controlling the characteristics of the solenoid, while a second potentiometer means independent of said first potentiometer means controls the arcing potential.

The welding system comprises a power supply unit PS connected to a commercial source of power, for example, and a welding fixture WF associated with the power supply unit PS by leads L1 to L3. The power supply unit PS and welding fixture WS have a common ground return.

The power supply unit PS includes a pair of storage capacitors C1 and C2 which may be separately and selectively controlled to assume a desired charge; one capacitor being associated with the electrode or weldment holder of the welding fixture WF and the other capacitor being associated with the winding of a solenoid S which carries another weldment holder. A relay RLY in the power supply unit, controlled by a push button or switch PB1 on the welding fixture WF, connects the two capacitors C1 and C2 to their respective components in the fixture WF, causing an arc to be established between the weldments and thereafter causing the weldments to be forcibly driven together.

The invention will be more clearly understood from the following description of a specific embodiment of the invention together with the accompanying drawing, in which:

The single figure is a schematic diagrammatic illustration of an embodiment of the present invention utilizing a dual-energy power supply together with a percussive arc welding apparatus.

When the power switch SW1 is operated, 120 volts, 60 cycles, for example, are applied to the primary PR1 of transformer T, inducing an RMS voltage of 120 volts in the secondary SEC, which is applied to each of the half-wave rectifiers D1, D3 and D5.

The circuit components are so selected that a direct current voltage of approximately 170 volts is supplied to solenoid control potentiometer R1. A charging voltage from the wiper arm of potentiometer R1 is supplied to the solenoid storage capacitor C1 through the steering diode D2 and normally closed contacts 1 of unoperated relay RLY. The precise charge on capacitor C1 is controlled by the setting of the solenoid control potentiometer R1.

A similar circuit, consisting of the weld control potentiometer R2, causes capacitor C2 to be charged through steering diode D4 and normally closed contacts 2 of relay RLY. The magnitude of the charge is controlled by the setting of the wiper arm on poteniometer R2.

The capacitors C1 and C2 are connected to the moving contact elements of contact sets 1 and 2, respectively, of relay RLY and the normally open contact elements are connected to leads L1 and L2 extending to the welding fixture.

A voltage from the secondary SEC of transformer T is rectified by diode D5 and appears on one side of the winding of relay RLY through relay control potentiometer R3. The other side of the winding of the relay RLY extends to the welding fixture WF over lead L3.

The contact sets 1 and 2 on relay RLY are adjusted so that make contacts 2 close before make contacts 1 in order to insure that lead L2 has a potential thereon prior to the placing of a potential on lead L1.

The welding fixture comprises a gun structure similar to that disclosed in the noted copending application but is shown here in diagrammatic form for purposes of clarity. The electrode holder H2 is a fixed element supporting, for axial movement, a movable solenoid core S which includes a weldment holder H1. A solenoid winding W encircles the solenoid core S and imparts to the core, a forward movement to the right when the winding W is energized. A return spring or suitable means, not shown, returns the core S to its illustrated position when the winding W is de-enerigzed. The winding W has one end connected to ground and the other end connected to the the lead L1.

The holder H1 is arranged to receive and fixedly hold an electrode E1 while holder H2 is arranged to receive and fixedly hold an electrode E2 which is to be welded to electrode E1.

A push button switch or key PB1 is provided on the welding fixture and is arranged to connect ground potential to lead L3 when the push button PB1 is operated.

The operation of the system in forging electrode E1 to electrode E2 will now be described.

After the operator places the electrodes E1 and E2 in respective holders H1 and H2 and the power supply unit PS has stored a desired charge on capacitors C1 and C2, the operator depresses push-button PB1 to place a ground potential on one side of the winding of relay RLY over lead L3. Since a direct current voltage is present on the other end of the relay winding, relay RLY is energized. The electrodes are spaced apart sufficiently to prevent any arcing until the solenoid core is moved.

Relay RLY operates and, as above noted, closes its contact set 2 a short time before contact set 1 is closed.

The voltage across capacitor C2 appears on electrode E1 but due to the spacing of electrode E1 from electrode E2, no current flows at this time. Shortly thereafter, when make contacts 1 are closed, capacitor C1 starts to discharge through the winding W of the solenoid, causing solenoid core S and the electrode E1 to move toward electrode 2 at a velocity and speed determined by the charge on capacitor C1 and by the electrical and mechanical characteristics of the welding fixture.

As electrode E1 approaches electrode E2, the potential appearing therebetween from the charge on capacitor C2 causes an arc to be established, resulting the melting of the electrode ends of the E1 and E2. At the same time, these electrodes are approaching each other.

When the melted ends of the weldments E1 and E2 are driven together by the force of the solenoid core S, a forged connection is established.

When the capacitors C1 and C2 have discharged, welding current and solenoid actuation ceases. The push button PB1 is relaesed and relay RLY is restored. The welded elements E1 and E2 may be removed from their respective holders. The core S returns to its illustrated position.

After relay RLY restores, a charging circuit is again established for capacitors C1 and C2 in preparation for welding new elements E1 and E2.

If a higher arcing potential is desired for providing a faster burn-back, the potentiometer R2 is correspondingly adjusted. Similarly, if a greater speed or forging force is required, potentiometer R1 is correspondingly adjusted.

While I have disclosed my invention in conjunction with specific apparatus, it is to be understood that numerous other embodiments could be employed without departing from the spirit of my invention.

I claim:
1. A percussive arc welding system, comprising a welding fixture comprising a fixed holder for supporting a first electrode in fixed relationship to said fixture, a movable holder for supporting a second electrode and electromagnetically influenced; a power source electrically connected with said welding fixture, comprising a first electrical energy storage circuit, a second electrical energy storage circuit; an electrical winding electrically insulated from said movable holder and disposed in flux linking relationship therewith; means for connecting said first energy storage circuit to said electrodes and for connecting said second energy storage circuit to said winding; first control means for varying the potential between said electrodes; and second control means for varying the velocity and force of said movable holder independently of said first control means.

2. A percussive arc welding system as set forth in claim 1 wherein said means for connecting includes relay means in said power source controlled by switching means on said welding fixture.

3. A percussive arc welding system as set forth in claim 1 wherein said first and second electrical energy storage circuits comprise separately chargeable capacitance means and wherein said first and second control means control the charge established on said capacitance means.

4. A percussive arc welding system as set forth in claim 3 wherein one side of the capacitance means of said first electrical energy storage circuit is connected to said movable holder and the other side thereof is connected to said fixed holder.

5. A percussive arc welding system, comprising a power source, a second electrical energy storage circuit having capacitance means electrically connected to said power source, a second electrical energy storge circuit having second capacitance means electrically connected to said power source, said first and second capacitance means being chargeable independently of each other, a welding fixture having means for supporting a first and a second electrode, said support means including means for fixedly holding said first electrode, electromagnetic means for movably holding said second electrode, first means for connecting said first electrical energy storage circuit to said electrodes for establishing a potential of varying predetermined magnitude therebetween, second means independent of said first means for electrically connecting circuit to said electromagnetic means for moving said second electrode toward said first electrode with a predetermined velocity and force, said velocity and force being controlled by said second means independently of the magnitude of said potential.

6. A percussive arc welding system as set forth in claim 5, wherein said first means electrically connects said first capacitance means to said electrodes, and said second means electrically connects said second capacitance means to said electromagnetic means.

7. A percussive arc welding system as set forth in claim 5, wherein said electromagnetic means includes an electric winding in flux linking relationship with a movable electrode holder.

References Cited

UNITED STATES PATENTS

| | | | |
|---|---|---|---|
| 2,419,749 | 4/1947 | Weinhardt et al. | 219—95 |
| 2,755,365 | 7/1956 | Frank | 219—95 |
| 3,244,854 | 4/1966 | Bucci et al. | 219—98 |
| 3,254,193 | 5/1966 | Phillips | 219—95 |

RICHARD M. WOOD, *Primary Examiner.*

R. F. STAUBLY, *Assistant Examiner.*

UNITED STATES PATENT OFFICE
CERTIFICATE OF CORRECTION

Patent No. 3,325,622                      June 13, 1967

James E. Cordner

It is hereby certified that error appears in the above numbered patent requiring correction and that the said Letters Patent should read as corrected below.

Column 4, line 37, for "second" read -- first --; line 49, after "connecting" insert -- said second electrical energy storage --.

Signed and sealed this 2nd day of January 1968.

(SEAL)
Attest:

Edward M. Fletcher, Jr.                      EDWARD J. BRENNER
Attesting Officer                          Commissioner of Patents